United States Patent
Beck

[15] 3,698,702
[45] Oct. 17, 1972

[54] COMPOSITE LEAF SPRING

[72] Inventor: Merril G. Beck, Erie, Pa.

[73] Assignee: Lord Corporation, Erie, Pa.

[22] Filed: March 5, 1971

[21] Appl. No.: 121,457

[52] U.S. Cl. ................................................ 267/47
[51] Int. Cl. ............................................. F16f 1/30
[58] Field of Search ....................... 267/47, 30, 152

[56] References Cited

UNITED STATES PATENTS

| | | | |
|---|---|---|---|
| 2,052,930 | 9/1936 | Laursen | 267/47 |
| 2,557,610 | 6/1951 | Meyers et al. | 267/30 |
| 3,544,176 | 12/1970 | Slater | 267/152 |

Primary Examiner—James B. Marbert
Attorney—James W. Wright

[57] ABSTRACT

A composite leaf spring formed of two superimposed spring leaves. One of the spring leaves is a tensile member and the other is a compressive member. The tensile member is an elongate leaf formed of a flexible nonextensible material such as metal, fiberglass, fabric, etc. and the compressive member is an elastomer leaf adhered, preferably by bonding, in contiguous superimposed relation to the nonextensible leaf. The neutral axis in flexure of the composite leaf spring is preferably located either at the interface of the nonextensible and elastomer leaf or in the nonextensible leaf whereby upon flexure, only compressive stresses are introduced into the elastomer leaf.

12 Claims, 9 Drawing Figures

INVENTOR
MERRIL G. BECK
BY James W. Wright
ATTORNEY

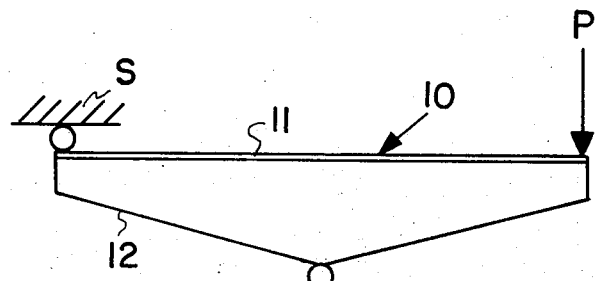
Fig. 5.
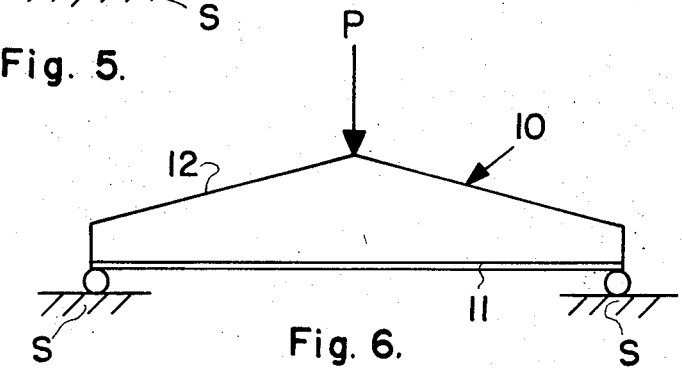
Fig. 6.
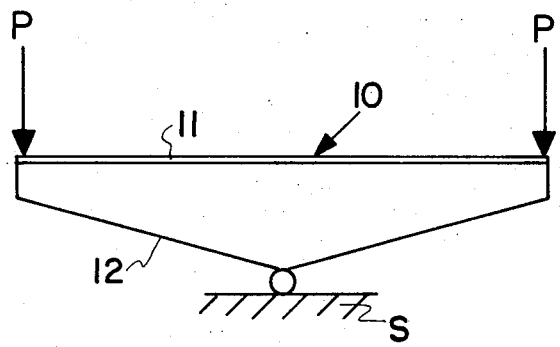
Fig. 7.
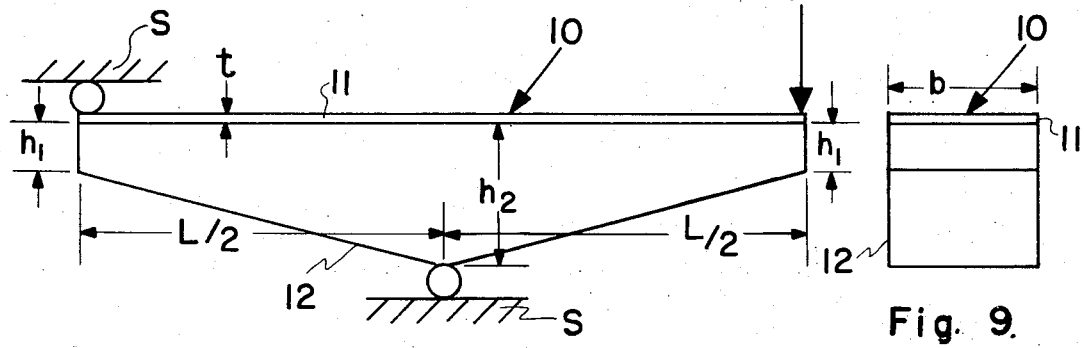
Fig. 8.
Fig. 9.
INVENTOR
MERRIL G. BECK
BY James W. Wright
ATTORNEY

COMPOSITE LEAF SPRING

This invention relates generally to a leaf spring for vehicles and the like and more particularly to a composite leaf spring.

Leaf springs are conventionally formed of a single metal leaf or a plurality of superimposed metal leaves, commonly called multileaf springs. In some of the multileaf springs, elastomer has been disposed between leaves in order to eliminate friction between leaves while providing some damping in the spring. However, in all of these conventional leaf springs, metal is utilized in bending or flexure to carry both the tensile and compressive stresses. As a result, the performance characteristics of such leaf springs have been limited to characteristics obtainable from metal leaves and combinations thereof.

As a result in lightweight vehicles, such as golf cars, snowmobiles, trailers, etc., it is difficult to provide a suspension system utilizing metal leaf springs and obtain a smooth ride. Typically, in order to provide a metal leaf spring with load carrying ability and load deflection characteristics which will allow an acceptable ride, it is necessary that the metal leaf spring be relatively long. Furthermore, shackle attachments are necessary for at least one end to compensate for change in length of the leaf spring during deflection. In addition, relatively long leaf springs usually have very little resistance to twist or roll. Consequently, a sway bar is required to increase the sway or roll resistance of the vehicle. Shock absorbers are utilized in combination with these conventional metal leaf springs to add damping to control excessive motion for resonance or near resonance conditions. Such suspension systems for light weight vehicles consume a relatively large amount of space, are relatively complex, costly, add unnecessary weight to the vehicle and oftentimes do not provide a satisfactory ride.

Thus, it is an object of the present invention to provide a composite leaf spring which, while being relatively short, is capable of supporting a lightweight vehicle while providing relatively large deflections for small changes in load and, thus, a smooth ride.

It is a further object of the present invention to provide a composite leaf spring that includes self-damping properties and, thus, decreases and in some instances eliminates the need for shock absorbers.

Another and still further object of the present invention is to provide a composite leaf spring which functions satisfactorily in the absence of a shackle and/or sway bar as a suspension system for a lightweight vehicle.

Briefly, the above objects are accomplished in a composite leaf spring comprising a single elongate, preferably planar, flexible nonextensible leaf and a single elastomer leaf of length substantially equivalent to that of the nonextensible leaf. The elastomer leaf has a surface, preferably planar, adhered in contiguous relation with one side of the nonextensible leaf to prevent relative movement therebetween upon lengthwise flexure or bending. The leaves preferably have relative modulus, tensile modulus for the nonextensible leaf and compressive modulus for the elastomer leaf, thickness and width to define a neutral axis in flexure located either at the interface between the nonextensible leaf and elastomer leaf or in the nonextensible leaf whereby upon lengthwise flexure of the composite leaf spring in a direction from the nonextensible leaf away from the elastomer leaf, the elastomer leaf will only be subjected to compressive stresses.

In certain designs of the present invention, it has been found advantageous to have the nonextensible leaf predeflected in a direction opposite to the direction of flexure during use. Some of the reasons for this are to minimize the tensile stresses introduced into the nonextensible leaf during operation, to accommodate shrinkage of the elastomer during molding, to minimize the change in length of the composite spring during operation and to minimize the stresses in the nonextensible leaf under static load conditions.

In any event, it is desirable that the elastomer leaf be of continually decreasing thickness from a point intermediate opposite ends, point of connection to a supporting or supported structure, to opposite ends to provide a substantially uniform stress distribution in the elastomer leaf throughout its entire length and, thus, obtain maximum efficiency and conserve the amount of elastomer utilized.

To provide for connection of the composite leaf spring between a supporting and supported structure, first attachment means are disposed adjacent opposite ends and a second attachment means is disposed intermediate the first attachment means. While the attachment means may take on many forms, the first attachment means are preferably elastomer lugs bonded to the nonextensible leaf adjacent opposite ends on the side remote from the elastomer leaf and include means therein, such as bushings for interconnection to one of a supporting and supported structure. Bushing means may be disposed in the elastomer leaf intermediate opposite ends for interconnection to one of a supporting and supported structure. The utilization of elastomer attachment means, in addition to being economical, accommodate for changes in distances between attachment means during flexure of the composite leaf spring.

Some of the objects of the invention having been stated, other objects will appear as the description proceeds, when taken in connection with the accompanying drawings, in which:

FIGS. 5–7 are schematic elevational views of a composite leaf spring similar to that of FIG. 1, illustrating various load carrying arrangements thereof; and FIGS. 8 and 9 illustrate the various design parameters of a particular composite leaf spring of the present invention.

Figure 1:
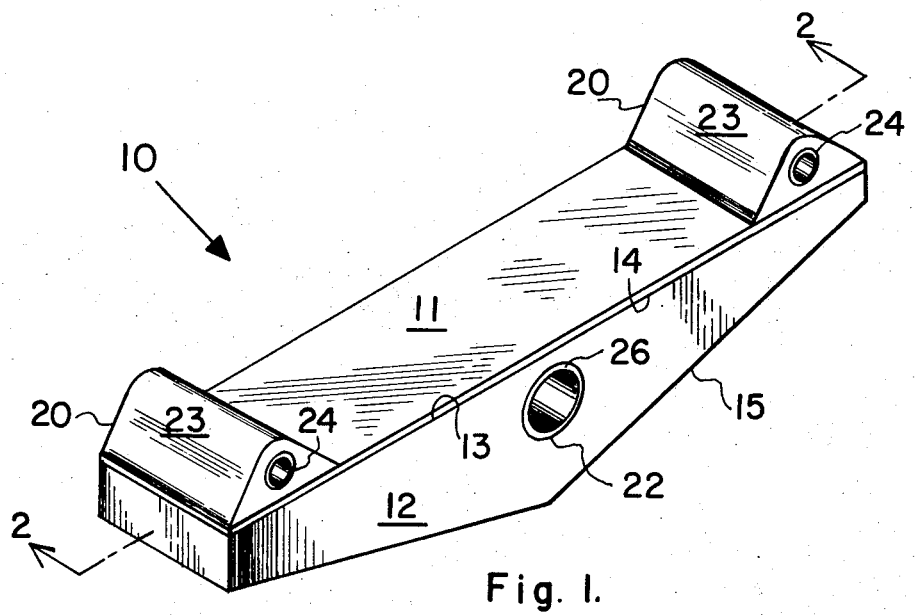
FIG. 1 is a perspective view of a composite leaf spring of the present invention.
Figure 2:
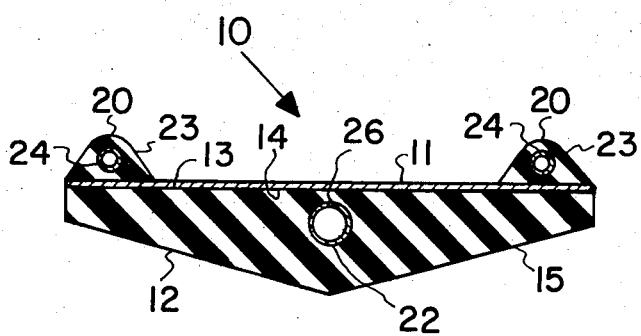
FIG. 2 is a reduced sectional view taken substantially along the line 2—2 of FIG. 1.
Figure 3:
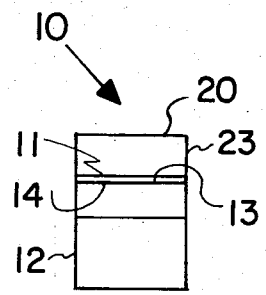
FIG. 3 is an end view of the leaf spring of FIG. 2.

Referring more specifically to the drawings wherein like reference characters are employed to indicate like part, there is illustrated in FIGS. 1–3 a composite leaf spring, generally designated at 10, of the present invention. The composite leaf spring 10 comprises only two superimposed spring leaves 11 and 12.

Spring leaf 11 is a tensile member and comprises an elongate leaf of flexible nonextensible material such as metal, fiberglass, fabric and the like of substantially uniform width and thickness throughout its entire length. In the present instance, spring leaf 11 is formed of a metal such as spring steel. Spring leaf 12 is a compressive member and is formed of an elastomer, natural or synthetic. It has a length and width substantially equivalent to that of the metal leaf 11. The elastomer leaf 12 is disposed contiguous with one side of the metal leaf 11 with proximate surfaces 13 and 14 respectively, adhered, preferably by bonding, together to prevent relative movement therebetween upon lengthwise flexure. As illustrated in FIGS. 1–3, the metal leaf 11 is planar and the surface 13 of the elastomer leaf 12 in contiguous relation with surface 14 of the metal leaf 11 is planar so that the surfaces 13 and 14 mate and are bonded together throughout their length and width.

The elastomer leaf 12, as illustrated, preferably is of continually decreasing thickness from a point intermediate opposite ends to opposite ends. The continually decreasing thickness can be obtained by various means, such as tapering the surface 15 from the intermediate point to opposite ends. Another method is to provide the surface 15 with a substantially parabolic longitudinal shape with the apex located at the intermediate point which converges toward the metal leaf 11 at opposite ends of the elastomer leaf 12. This continually decreasing thickness in the elastomer leaf 12 provides for a substantial uniform stress distribution in the elastomer leaf 12 throughout the length thereof during flexure. Such a design minimizes the amount of elastomer utilized to conserve cost and weight. In addition, a more uniform spring rate is obtained.

Various attachment means may be employed in order to interconnect the composite spring 10 in operative relation between a supporting and supported structure. In the embodiment of FIGS. 1–3, first attachment means 20 are disposed adjacent opposite ends of the metal leaf 11 and a second attachment means 22 is disposed intermediate the first attachment means 20. As illustrated, the first attachment means 20 comprise elastomer lugs 23, preferably formed of the same elastomer as elastomer leaf 12, bonded to the metal leaf 11 adjacent opposite ends thereof on the side remote from the elastomer leaf 12. Annular bushings 24 are disposed in apertures widthwise of the elastomer leaf 12 and parallel to the width of the metal leaf 11. The elastomer lugs 20 and bushings 24 cooperative to provide for attachment of each end of the composite leaf spring 10 to one of a supporting and supported structure. The second attachment means 22 includes an annular bushing 26 disposed in an aperture widthwise of the elastomer leaf 12 intermediate opposite ends thereof. The bushing 26 is preferably close to the metal leaf 11 to lessen the tendency of the portion of the elastomer leaf 12 between the bushing 26 and surface 15 of the elastomer leaf 12 to buckle during flexure. With elastomer surrounding the bushings 24 and 26, changes in lengths between bushings 24 and 26 during flexure will be accommodated by displacement of the elastomer. In addition, some vibration isolation is provided in the connections between the composite leaf spring 10 and the supporting and supported structures.

In the design of a composite leaf spring 10 of the present invention, it is highly desirable that the neutral axis of the composite spring 10 in flexure throughout the length thereof be located either at the bond or interface between the metal leaf 11 and elastomer leaf 12 or in the metal leaf 11. This location of the neutral axis is desired to prevent the establishment of tensile stresses during flexure in the elastomer leaf 12. As is well-known, elastomers are not well-suited for carrying repeated tensile stresses. The positioning of the neutral axis can be controlled by proper selection of design parameters including relative modulus of the leaves 11 and 12, the widths and thickness of each through conventional design techniques.

Since elastomers are not well-suited for carrying repeated tensile stresses, the composite leaf spring 10 is interconnected between a supporting and supported structure for load carrying flexure in a direction from the metal leaf 11 away from the elastomer leaf 12. With the neutral axis located as indicated above, the elastomer leaf 12 will only be subjected to compressive, as contrasted to tensile, stresses during flexure. Thus, the problems involved when an elastomer is subjected to tensile stresses are eliminated.

Figure 4:
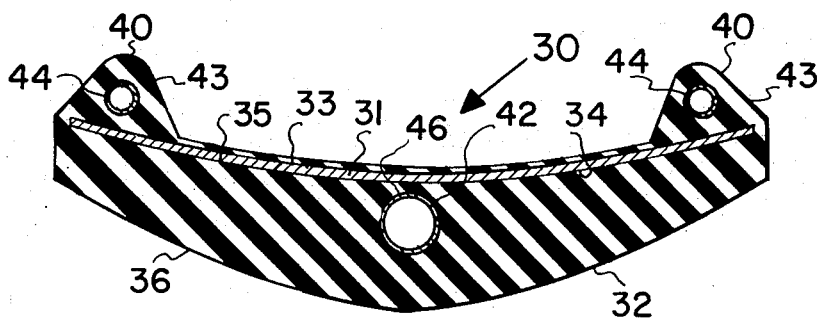
FIG. 4 is a sectional view of a modified composite leaf spring of the present invention.

FIG. 4 illustrates a modified embodiment of a composite leaf spring, generally designated at 30, constructed in accordance with the present invention. As before, the composite leaf spring 30 comprises only two superimposed leaves 31 and 32. Spring leaf 31 is a tensile member and comprises an elongate leaf of metal, such as a spring steel of substantially uniform width and thickness throughout its entire length. While the metal leaf 31 is normally planar, in the undeflected condition, it is predeflected within the elastic range in a direction opposite to that which the composite leaf spring 30 is to be flexed during use. With the metal leaf 31 predeflected, opposite sides thereof define concave and convex surfaces 33 and 34, respectively. Spring leaf 32 is a compressive member and is formed of an elastomer, natural or synthetic. It is of a width and length substantially equivalent to that of the metal leaf 31 and has a concave surface 35 extending the length thereof mating with and bonded in contiguous relation with the convex surface 34 of the predeflected metal leaf 31.

The elastomer leaf 32 is of continually decreasing thickness from a point intermediate opposite ends to opposite ends. In FIG. 4, the intermediate point is centrally located between opposite ends. This continually decreasing thickness is obtained by the surface 36 of the elastomer leaf 32 remote from the metal leaf 31 having a substantially parabolic contour throughout the length thereof with the apex located centrally of the composite leaf spring 30 and which at opposite ends converges toward the metal leaf 31.

The composite leaf spring 30 includes first attachment means 40 adjacent opposite ends of the metal leaf 31 and a second attachment means 42 intermediate opposite ends. The first attachment means 40 are in the form of elastomer lugs 43 and bushings 44 similar to that of the composite leaf spring 10, previously described. Likewise, the second attachment means 42 comprises an annular bushing 46 disposed in an aperture widthwise of elastomer leaf 32.

To protect the metal leaf 31 from environmental effects, a coating of elastomer is provided over the exposed surfaces, surface 33 in particular. The ends and edges of the metal leaf may be coated by making the metal leaf slightly shorter and narrower than the elastomer leaf 32 and completely enclosing the metal leaf 31 by molding elastomer parts of the composite leaf spring 30 about the metal leaf 32 while in the predeflected condition.

By having the metal leaf 31 predeflected in an unloaded condition, numerous advantages are obtained. First, under any given load condition, less tensile stresses are introduced into the metal leaf 31. In fact, the composite leaf spring 30 can be designed such that under a static load condition, no tensile stresses are introduced in the metal leaf 31. Second, the changes in distance between attachment points are minimized for a given amount of total deflection. Third, since the composite leaf spring 30 is readily formed by vulcanizing elastomer to the metal leaf 31, predeflection in the metal leaf 31 will compensate for shrinkage of the elastomer following vulcanization.

As with the composite leaf spring 10, the metal leaf 31 and elastomer leaf 32 are designed such that the neutral axis of the composite leaf spring 30 is located throughout its length at either the bond or interface between the metal leaf 31 and elastomer leaf 32 or in the metal leaf 31. In this manner, only compressive, as contrasted to tensile stresses, are introduced into the elastomer leaf 32 during flexure of the composite leaf spring 30 in a direction from the metal leaf 31 away from the elastomer leaf 32.

While the above embodiments have the second attachment means located substantially centrally between opposite ends, it will be understood that such second attachment means may be positioned other than centrally between opposite ends. Likewise, the point intermediate opposite ends from which the thickness of the elastomer leaf decreases may be located other than centrally between opposite ends as required in accordance with the use of the composite leaf spring.

With reference to FIGS. 5–7, there is schematically shown various manners of utilizing a composite leaf spring of the present invention wherein the composite leaf spring is generally indicated at 10, the metal leaf at 11, the elastomer leaf at 12, the supporting structure at S and the supported structure or load at P. The arrangement in FIG. 5 has been found highly desirable where large deflections are required for given changes in effective supporting load P.

By way of example, reference is made to FIGS. 8 and 9 to a composite leaf spring 10 including a metal leaf 11 and an elastomer leaf 12 wherein the parameters there noted had the following values:

$t$ (thickness of metal leaf) = 0.042 in.
$h_1$ (thickness of elastomer leaf at end) = 1.0625 in.
$h_2$ (thickness of elastomer leaf at center) = 2.125 in.
L (total length of composite leaf spring) = 8.50 in.
b (width of metal and elastomer leaves) = 2.00 in.
P (static load supported) = 400 lbs.

For this design, wherein the metal leaf 11 is formed of steel and the elastomer leaf 12 is formed of urethane, and the composite leaf spring 10 is supported as illustrated, the composite leaf spring 10 had a measured spring rate of approximately 350 pounds/inch. The desired spring rate can be readily obtained by utilizing other elastomers and flexible nonextensible materials and/or by properly altering the above mentioned design parameters.

By the composite leaf spring of the present invention, there is provided a leaf spring which utilizes in combination with a conventional flexible nonextensible leaf an elastomer leaf that operates in compression. By proper location of the neutral axis in flexure, the elastomer leaf may be only subjected to compressive, as contrasted, to tensile stresses. Such a composite leaf spring can be made small in size, particularly in length, while providing highly desirable suspension properties for supporting lightweight vehicles, such as golf cars, trailers, and the like. In addition to supporting the static load of such lightweight vehicles, the composite leaf spring has a relatively low spring rate and, thus, is capable of providing a smooth ride. The relatively short lengths of the composite leaf spring that may be utilized in a given suspension system provides relatively good resistance to twist or roll and, thus, in many instances, the need for sway bars or other conventional means theretofore used for providing resistance to roll may be eliminated. In addition, depending on the elastomer used, it may be unnecessary to have separate damping means in a suspension system employing such a composite leaf spring since inherent damping is provided. Thus, it will be seen that the composite leaf spring is capable of providing a relatively lightweight, inexpensive suspension system for lightweight vehicles. While the composite leaf spring has particular utility in suspension systems for lightweight vehicles, it will be apparent that it may be readily adapted to many other uses.

In the drawings and specification, there has been set forth a preferred embodiment of the invention and, although specific terms are employed, they are used in a generic and descriptive sense only and not for purposes of limitation.

What is claimed is:

1. A composite leaf spring consisting essentially of two superimposed spring leaves, one of said spring leaves being a tensile member and the other a compressive member, said tensile member comprising an elongate body of flexible nonextensible material and said compressive member comprising an elastomer leaf of length substantially equivalent to that of said nonextensible body adhered in contiguous superimposed relation to said nonextensible body, said adhered nonextensible body and elastomer leaf having a neutral axis in flexure defined in close proximity to the interface between said nonextensible body and elastomer leaf whereby upon flexure of said composite spring in a direction from said nonextensible body away from said elastomer leaf said elastomer leaf will be substantially subjected to compressive stresses.

2. A composite leaf spring consisting essentially of two superimposed spring leaves, one of said spring leaves being a tensile member and the other a compressive member, said tensile member comprising an elongate leaf of flexible nonextensible material and said compressive member comprising an elastomer leaf of length substantially equivalent to that of said nonextensible leaf adhered in contiguous superimposed relation to said nonextensible leaf, said adhered nonextensible leaf and elastomer leaf having a neutral axis in flexure defined either at the interface between said nonextensible leaf and elastomer leaf or in said nonextensible leaf whereby upon flexure of said composite spring in a direction from said nonextensible leaf away from said elastomer leaf said elastomer leaf will only be subjected to compressive stresses.

3. A composite leaf spring, as set forth in claim 2, wherein said elastomer leaf is of continually decreasing thickness from a point intermediate opposite ends to opposite ends.

4. A composite leaf spring, as set forth in claim 2, including first attachment means adjacent opposite ends of said nonextensible leaf and second attachment means adjacent said nonextensible leaf and intermediate said first attachment means.

5. A composite leaf spring, as set forth in claim 4, wherein said first attachment means are secured to the side of said nonextensible leaf opposed to said elastomer leaf.

6. A composite leaf spring, as set forth in claim 2, including elastomer lugs bonded to said nonextensible leaf adjacent opposite ends thereof on the side remote from said elastomer leaf and having means therein for attachment of each end of said composite spring to one of a supporting and supported structure.

7. A composite leaf spring, as set forth in claim 2, including elastomer lugs bonded to said nonextensible leaf adjacent opposite ends thereof on the side remote from said elastomer leaf, each of said lugs having an aperture disposed therethrough widthwise of said nonextensible leaf, bushing means disposed in said apertures, said lugs and bushing means cooperating to provide for attachment of each end of said composite spring to one of a supporting and supported structure, and wherein said elastomer leaf has intermediate opposite ends thereof an aperture disposed therethrough widthwise and including bushing means disposed in said aperture and providing for attachment of said composite spring to one of a supporting and supported structure.

8. A composite leaf spring consisting essentially of a single elongate leaf of metal of substantially uniform width and thickness throughout its length, a single elastomer leaf disposed contiguous with one side of said metal leaf of width substantially equivalent to that of said metal leaf, said metal leaf and elastomer leaf having proximate surfaces adhered to prevent relative movement therebetween upon lengthwise flexure thereof, said adhered metal and elastomer leaves having a neutral axis in flexure defined either at the interface between the metal leaf and elastomer leaf or in the metal leaf whereby upon lengthwise flexure of said composite spring in a direction from said metal leaf away from said elastomer leaf said elastomer leaf will only be subjected to compressive stresses.

9 A composite leaf spring consisting essentially of a single elongate planar metal leaf having substantially uniform width and thickness throughout its length, a single elastomer leaf of width and length substantially equivalent to that of said metal leaf, said elastomer leaf having a substantially planar surface bonded in contiguous relation with one side of said metal leaf, said elastomer leaf having a continually decreasing thickness from a point intermediate opposite ends to opposite ends, said bonded metal leaf and elastomer leaf having a neutral axis in flexure defined either at said bond between said metal leaf and elastomer leaf or in said metal leaf whereby, upon flexure of said composite in a direction from said metal leaf away from said elastomer leaf, said elastomer leaf will only be subjected to compressive stresses.

10. A composite leaf spring consisting essentially of a single elongate planar leaf of flexible nonextensible material of substantially uniform width and thickness throughout its length, said planar nonextensible leaf being predeflected lengthwise with opposite sides thereof defining a concave and a convex surface respectively, a single elastomer leaf of width and length substantially equivalent to that of said nonextensible leaf, said elastomer leaf having a concave surface extending the length thereof mating with and bonded in contiguous relation with said convex surface of said nonextensible leaf, said bonded nonextensible leaf and elastomer leaf having a neutral axis in flexure defined either at said bond between said nonextensible leaf and elastomer leaf or in said nonextensible leaf whereby upon flexure of said composite spring in a direction from said nonextensible leaf away from said elastomer leaf said elastomer leaf will only be subjected to compressive stresses.

11. A composite leaf spring, as set forth in claim 10, wherein the surface of said elastomer leaf remote from said nonextensible leaf has a substantially parabolic contour which at opposite ends converges toward said nonextensible leaf.

12. A composite leaf spring, as set forth in claim 10, wherein said nonextensible leaf is formed of metal and is predeflected within the elastic range thereof.

* * * * *